United States Patent [19]

Tabor et al.

[11] Patent Number: 5,045,401
[45] Date of Patent: Sep. 3, 1991

[54] NON-ISOTHERMAL CRYSTALLIZABLE ADHESIVE COMPOSITIONS FOR MULTILAYER LAMINATED STRUCTURES

[75] Inventors: Ricky L. Tabor, Lake Jackson; Gerald M. Lancaster, Freeport; Michael W. Potts, Angleton; Thomas I. Butler, Lake Jackson, all of Tex.

[73] Assignee: The Dow Chemical Company, Midland, Mich.

[21] Appl. No.: 455,537

[22] Filed: Dec. 21, 1989

[51] Int. Cl.$^5$ .............................................. B32B 27/08
[52] U.S. Cl. ....................................... 428/516; 525/74
[58] Field of Search ......................... 525/74; 428/516; 156/64, 327, 334; 73/150 R, 150 A

[56] References Cited

U.S. PATENT DOCUMENTS

| | | |
|---|---|---|
| 3,658,948 | 4/1972 | McConnell . |
| 4,087,587 | 5/1978 | Shida et al. . |
| 4,230,830 | 10/1980 | Tanny et al. . |
| 4,298,712 | 11/1981 | Machonis, Jr. et al. . |
| 4,370,388 | 1/1983 | Mito et al. . |
| 4,394,485 | 7/1983 | Adur . |
| 4,397,916 | 8/1983 | Nagano . |
| 4,452,942 | 6/1984 | Shida et al. . |
| 4,460,632 | 7/1984 | Adur et al. . |
| 4,460,745 | 7/1984 | Adur et al. . |
| 4,487,885 | 12/1984 | Adur et al. . |
| 4,537,836 | 8/1985 | Adur et al. . |
| 4,684,576 | 8/1987 | Tabor et al. . |
| 4,762,890 | 8/1988 | Strait et al. . |

FOREIGN PATENT DOCUMENTS

| | | |
|---|---|---|
| 50-4114 | 1/1975 | Japan . |
| 2081723 | 5/1981 | United Kingdom . |
| 2107325 | 8/1982 | United Kingdom . |
| 2113696 | 12/1982 | United Kingdom . |

*Primary Examiner*—George F. Lesmes
*Assistant Examiner*—D. R. Zirker

[57] ABSTRACT

Multicomponent thermoplastic resin blends are disclosed which have a nonisothermal crystallization half life of less than thirty seconds. Especially preferred are three component resin blends comprising a maleic anhydride grafted HDPE, an unmodified LLDPE copolymer having a density between about 0.905 and 0.93 g/cc, and an unmodified LLDPE copolymer having a density between about 0.89 and 0.92 g/cc. These thermoplastic resin blends can be used as the adhesive layer in multilayer structures. They are especially useful in blown film multilayer structures and they show particularly good adhesion to polar substrates, e.g., EVOH substrates.

30 Claims, No Drawings

NON-ISOTHERMAL CRYSTALLIZABLE ADHESIVE COMPOSITIONS FOR MULTILAYER LAMINATED STRUCTURES

FIELD OF THE INVENTION

This invention pertains to crystallizable thermoplastic resin blends having a non-isothermal crystallization half-life of less than thirty seconds. The resin blends are useful as an adhesive layer(s) in forming improved multilayer laminated film structures.

BACKGROUND OF THE INVENTION

There is an increasingly strong trend to replace glass, metal, and paper containers with plastic containers to package goods for storage or sale, e.g., milk and juice containers. The driving force behind this trend includes many factors, e.g., improved energy efficiency in producing the containers, customer preference, reduced product loss due to breakage, reduced shipping costs, improved storage geometry, and improved storage performance. In general, the plastic containers are prepared by known techniques from a multilayer laminated film structure comprising (a) a barrier layer(s), (b) a structural component, (c) a sealant layer, (d) an adhesive layer and, optionally, (e) a scrap layer.

Most such structures contain one or more barrier layers designed to keep the contents of the package or container effectively within the confines of the package or container and to keep the external environment, such as oxygen or water, from entering the contents. The purpose of the structural component is usually to provide some means of supporting the product being contained. The sealant layer provides a means of closing (i.e., sealing) the package after the contents of the package or container has been introduced. Generally heat and pressure are used to close or seal the package or container although more recent technological advances use radio frequency or ultrasonic sealing means and techniques. A scrap layer (e.g., reground, off-grade polymer) can be and typically is used in the multilayer structure. The scrap layer may act as a structural component, but the main function of the scrap layer is to improve the economics of producing the package. The adhesive component holds all of the other components together, giving the package or container structural integrity. The external layer can be printed for product identification, and may be any of the layers discussed above. Typical multilayer film manufacturing techniques utilize cast and/or blown multilayer film.

Many adhesive layers are resin blends of thermoplastic polymers. The thermoplastic polymers form a known class of compounds which includes, for example, high density polyethylene (HDPE), low density polyethylene (LDPE), linear low density polyethylene (LLDPE), and ethylene/vinyl acetate (EVA) copolymers. The thermoplastic polymers can also have various unsaturated carboxylic acids, carboxylic acid anhydrides, or other acid derivatives grafted onto, or polymerized into the polymer. The purpose of the grafted portion of the resin is usually to enhance the adherence of the polymer to a substrate, especially polar substrates such as polyesters, polyamides, or ethylene/vinyl alcohol (EVOH) copolymers.

Mito et al. in U.S. Pat. No. 4,370,388 (Mitsui) describes a laminated multilayer structure which contains as one of the layers an adhesive composition consisting of (a) HDPE grafted with a dicarboxylic acid or functional derivatives there-of, (b) ethylene/4-methyl pentene copolymer, and (c) a "rubbery" synthetic polymer, with ethylene/propylene copolymers preferred as the rubbery polymer.

Another example, Adur et al. in U.S. Pat. No. 4,537,836 (Chemplex) describes a composite structure wherein a three component resin blend consisting essentially of (a) a graft copolymer, (b) LDPE, LLDPE, or mixtures thereof, and (c) a homopolymer or copolymer containing greater than 50 weight percent of an alpha olefin of 4-15 carbon atoms was alleged to be useful as the adhesive layer.

Yet another example of a laminated multilayer structure is disclosed in Nagano, U.S. Pat. No. 4,397,916 (Mitsui) wherein one of the layers of the multilayer structure was an adhesive layer comprising (a) an ethylene/alpha olefin copolymer blended with (b) a graft-modified ethylene/alpha-olefin copolymer having a carboxylic acid content between 0.01 to 10% by weight. The alpha-olefin was said to have from 3-30 carbon atoms.

While many of these polymer blends are taught to be useful as adhesive components in multilayer structures, there continues to be a commercial need for an adhesive with superior properties and/or better economics.

SUMMARY OF THE INVENTION

It has now been discovered that novel crystallizable thermoplastic resin blends having a non-isothermal crystallization half-life of less than thirty (30) seconds are uniquely effective as an adhesive layer or component for multilayer laminated film structures. The novel resin blends are especially useful as adhesives in blown film multilayer structures and they adhere particularly well to polar substrates, such as EVOH copolymers. Containers prepared from multilayer laminated film structures containing the novel resin blends have improved properties.

DETAILED DESCRIPTION OF THE INVENTION

Thermoplastic resins, as noted above, form a known class of polymers as described in *Modern Plastics Encyclopedia*, Volume 65, Number 11. Essentially any member of this known class can be used herein, with the provision that the thermoplastic resin is capable of forming a film structure. Members of this class of materials include aliphatic polyolefins, and particular polyethylenes. The LLDPE used in the blends used for this invention can be LLDPE which is a copolymer of ethylene with an alpha-olefin of $C_3$-$C_{12}$, preferably an alpha-olefin from $C_3$-$C_8$, such as propene-1, butene-1, pentene-1, hexene-1, 4-methyl pentene-1, octene-1, or the like, especially octene-1, and can be a mixture of olefins, such as propylene/octene or 4-methyl pentene-1-octene in an amount sufficient to yield a density from about 0.89 to about 0.93 grams/cubic centimeter, such that the non-isothermal crystallization half life of the total resin blend is less than 30 seconds. The LLDPE used in this invention may be an Ultralow-Density Polyethylene (ULDPE) having a density below about 0.915 grams/cubic centimeter, such as that described in *Modern Plastics Encyclopedia*, Volume 65, Number 11. Alternately, the LLDPE used for this invention may be a terpolymer of ethylene and two of the alpha-olefins having 3-12 carbon atoms. A terpolymer of ethylene, propylene ($C_3$), and octene ($C_8$) is an example. The molecular weight of the LLDPE used for this invention, as indicated by melt index (MI or $I_2$) measured according to ASTM D-1238 Condition 190/2.16 (formerly Condition E), is between about 0.1 MI to about 250 MI, especially between about 0.2 MI to about 25 MI. The LLDPE used in this invention is preferably unmodified: that is, the chemical structure of the polymer is not changed by chemical grafting or other chemical means.

The HDPE used in this invention has a density in the range of about 0.945 to about 0.97 grams/cubic centimeter and a MI from about 0 1 to about 200 grams/10 minutes. The HDPE can be a homopolymer of ethylene or it can be a copolymer of ethylene and at least one $C_3$-$C_{12}$ alpha-olefin(s). The alpha-olefins are typically used in sufficient quantity to cause the HDPE copolymer to have a density in the range from about 0.945 to about 0.97 grams/cubic centimeter.

The barrier layer in multilayer structures is normally comprised of a polar polymer. Any of the common polar barrier layers, such as nylon-6, polyester or polyamide, can be used but EVOH copolymers having a final ethylene content of between about 2% and about 60% by weight of the polymer and melt index of between about 0.2 and about 50 grams/10 minutes are presently preferred, and EVOH copolymers having a final ethylene content between about 15% and about 40% by weight of the polymer and melt index of between about 0.5 and about 20 grams/10 minutes are most preferred. The ethylenically unsaturated carboxylic acids (or their anhydrides) content of the grafted HDPE is between about 0.02% and about 3.0% by weight of the polymer, and is grafted onto the HDPE in any of the known manners, such as that described in Strait et al., U.S. Pat. No. 4,762,890 (The Dow Chemical Company).

Types of grafted copolymers effective in this invention include graft copolymers of HDPE and maleic anhydride (MAH), a mixture of methyl nadic anhydrides, maleic acid, nadic acid, fumaric acid, nadic anhydride, x-methyl nadic acid, or 7-oxabicyclo(2.2.1-)hept-5-ene dicarboxylic acid anhydride.

The structural layer, sealant layer, and optional scrap layer each may be one or more of the following: LDPE, LLDPE, HDPE, medium density polyethylene (MDPE), polypropylene (PP), ethylene/propylene copolymers, ethylene/vinyl acetate copolymers, ethylene/methyl acrylate copolymers, ethylene/methyl methacrylate copolymers, ethylene/acrylic acid copolymers, ethylene/methacrylic acid copolymers, various ionomers thereof, ethylene/carbon monoxide copolymers, ethylene/butyl acrylate copolymers, or the like.

The multilayer structure may contain any number of layers, in any suitable combination, with the provision that the adhesive layer defined by this invention be in contact with at least one side of the barrier layer.

The multilayer structures using the adhesive composition of the present invention may be made by any of the common known methods, such as a cast film process, but is beneficially made with a blown film process, and most preferably made with a single air external ring blown film process.

This invention relates to a method for consistently improving bond level between two or more layers of a multilayer laminated structure, especially when those layers consist of an adhesive layer defined by blends of the present invention and a barrier layer of an ethylene/vinyl alcohol copolymer. This invention has particular utility when used in blown film structures as distinguished from cast film techniques.

The adhesive strength influencing difference between these two film manufacturing techniques is primarily a function of the film cooling rate. In a cast film process, the cooling rate, also known as quench intensity, is fairly fast relative to that used in blown film processes. Blown film is cooled by air whereas cast film is cooled by contact with a chilled roll. The cooling of the film results in crystallization of the adhesive layer of the film forming resins used. Since the degree of quench intensity affects crystallization, the cooling rate is considerably slower for blown film processes, and because of this, crystallization rates are correspondingly slower, resulting in less effective utilization of the adhesive portion of the multilayer. This invention alleviates this inherent deficiency of the blown film process. By increasing the half-life of the non-isothermal crystallization rate of the adhesive layer, adhesive strength of the adhesive layer to the barrier layer is improved, especially adhesion to a polar barrier layer.

EXPERIMENTAL

Three layer blown films are prepared in accordance with this invention by fabrication on a Johnson 8-inch (20.32 cm) three layer (three manifold) coextrusion blown film single air ring cooled annular die fed by three extruders. The multilayer laminated film structure is an A/B/C configuration in which:

(1) The "A-layer" is the oxygen barrier layer and is extruded through the outer annular die as the outer layer. The "A-layer" extruder is a 2.5 inch (6.35 cm) Egan having an L/D ratio of 24:1. This extruder is used to feed a commercially available hydrolyzed ethylene/vinyl acetate (EVOH) copolymer (SOARNOL DT produced by Nippon Goshei) having a melt index of 3 grams/10 minutes, a density of 1.21 grams/cm$^3$ and an ethylene content of about 40 mole percent to the outer layer. This layer is maintained at a thickness of approximately 0.4 mils 0.01016 mm). The overall temperature profile of this extruder is maintained at approximately 425° F. (218° C.).

(II) The "B-layer" is the adhesive layer and is extruded through the middle annular die as the middle layer. The "B-layer" extruder is a 2.5 inch (6.35 cm) Egan having a screw L/D ratio of 24:1. This extruder is used to feed the middle annular die to form the center adhesive layer being evaluated. The thickness of this layer is approximately 0.3 mils (0.00762 mm).

(III) The "C-layer" is the structural and barrier layer and is extruded through an Egan 2.0 inch (5.08 cm) extruder having a length to diameter (L/D) ratio of 24:1. This Egan extruder is used to feed an ethylene/acrylic acid copolymer (MI=1.5, acrylic acid content=9%) to the inner annular die to form the inner "C" layer. The thickness of the "C" layer is about 1.2 mils 0.03048 mm). The overall temperature profile of this extruder is maintained at approximately 425° F. (218° C.).

The peel strength between the EVOH layer and the adhesive layer is determined by initiating the separation of the two layers by hand (acetone on the end of a cotton swab was occasionally used to reduce the peel strength to grasp the sample for beginning the test), then cutting a one inch (2.54 cm) strip out of the film. Peel strengths are then determined using an Instron testing device at a peel rate of 2 inches/minute (5.08 cm/minute).

An alternate screening method of evaluating the adhesive resins of this invention employs a heat seal measurement after making films of the desired materials separately. Films of the thermoplastic adhesives used in heat seal testing are blown on a ¾ inch (1.905 cm) Killion blown film unit, using a temperature profile of 325/350/400° F. (163/177/204° C.), for Zone 1/Zone 2/Die respectively. A minimum of 0.75 pounds (340.5 gms) of resin is required to blow film on the ¾ inch Killion extruder with a 1 inch (2.54 cm) film die. The films are fabricated so that they were 1.5 mils thick (+/−0.1 mil) and had a 3-4 inch (7.62-10.16 cm) lay flat. The freshly made films are heat sealed to the appropriate substrate within one week of fabrication. Meanwhile, the samples are stored in ZIPLOC ™ bags in a dessicator until use.

The various EVOH polymers, with varying percent ethylene are made into films by compression molding between pieces of glass reinforced polytetrafluoroethylene (PTFE). The molded platens are maintained at 440° F. (227° C.) and approximately 5 grams (0.011 pounds) of the EVOH to be molded are placed on the PTFE cloth and heated without pressure for two minutes, then pressed at 10,000 pounds per square inch (psi) for one minute and quenched between ambient temperature platens.

Heat seals of the two films made by the methods described above are made using an Asko 9-point heat sealer. The temperatures at each sealing point were equilibrated at 320° F. for several hours prior to use. The instrument was slightly modified by adding adjustable locking leveling bolts to the bottom of the heat sealer, to assure that the mechanism maintained a level stance. The levelness of the instrument was assured prior to each use via a liquid bubble carpenter's level. A PTFE impregnated glass cloth covered the seal bars of the instrument as purchased from Asko. This cloth was removed to allow direct contact of the seal bars with the multilayer film structure being sealed. The heat seal procedure used required the use of 3 mils thick Mylar* (urethane coated polyethyleneterphalate made by DuPont). The sealing pressure is held constant at 40 psi. The dimensions of the film samples tested are 3 inches by 8 inches (7.6 cm by 20.3 cm). The adhesive films evaluated are 1.4 to 1.6 mils thick. The film structure utilized is as follows:

---
SEAL BARS (Surface Measures 1.25 inches by 0.5 inches)
MYLAR* film (release agent against the adhesive)
ADHESIVE film
EVOH film
RUBBER SUPPORT PAD
---

(Prior to each seal, the lower surfaces of the seal bars were visually inspected to insure that no residual polymer or oxidative build-up had occurred which could cause spurious pressure sites. When residue was observed, the bar surfaces were cleaned using a copper scrub pad.)

The multilayer film structure is then placed under the sealing bars and the actuation switch is pressed. After a seal is made using a 1.2 second dwell time, the structure is set aside for one minute while the sealed areas cool. After cooling, the Mylar* is carefully removed from the now sealed adhesive/EVOH structure. The adhesive film being tested is fabricated into film every two weeks to assure that no significant hydrolysis of the active anhydride functionallity has occurred. During the interim, the film is stored in a dessicator.

Peel strength or adhesion measurements are made by centering five of the sealed areas between the blades of a one inch film cutter leaving 0.25 inches on each side of the sealed area which had not been sealed, and the samples are cut into one inch strips. The samples are then peeled along the length of the seal, meaning that the width of the seal being peeled is 0.5 inches. The five samples are peeled using a tensile testing Instron with a 1 pound scale load at a crosshead speed of 5 inches/minute and a chart drive setting of 2 inches/minute. Peel strengths are recorded in units of grams/0.5 inch. The specimens are peeled without controlling the angle of peel. The sealed samples are peeled within a twelve hour period of being sealed.

The non-isothermal crystallization half-life of the adhesive resins described in the present invention is measured by using Differential Scanning Calorimetry (DSC). The Perkin-Elmer DSC-4 is operated non-isothermally by heating a 4 milligram sample of the adhesive resin or resin blend to 220° C., holding for 1 minute, and then cooling at a rate of −20° C./minute to 0° C. The cooling curve is recorded, and the baseline is flattened as much as possible mathematically, utilizing the Perkin Elmer TADS software. A simple first order reaction kinetics equation is used to calculate the half-life crystallization data. The equation used is:

$$-kt = \ln \frac{[x]}{[1-x]}$$

where
x = the fraction of polymer in the crystalline phase
k = the crystallization rate constant
t = time.

The calculations are performed on 75% of the final crystallization which occurred. Half life data are calculated from the digitized data using the DSC measured final crystallinity of the sample as a best approximation of the final crystallinity. The non-isothermal crystallization half-life of the sample is then calculated using the crystallization rate constant obtained above, then solving for time "t" at a crystallinity of 50% of the final crystallinity of the tested sample in question.

EXAMPLE 1

A three component blend of polymers (ADMER NF 550) comprising an ethylene/butene copolymer with a total butene content of 3.6% as measured by $C_{13}$ Nuclear Magnetic Resonance (NMR), an ethylene/propylene copolymer with a total propylene content of about 6.9% as measured by $C_{13}$ NMR (0.6% of the propylene is isotactic or blocked propylene) and a maleic anhydride grafted HDPE is fabricated into blown film as described above. This resin blend has a melt index of about 6.4 grams/10 minutes, a density of about 0.91 grams/cm$^3$, and a maleic anhydride (MAH) content of about 0.24% by weight. The blown film structure made with this adhesive resin has an EVOH adhesion level of about 382 grams/inch. The resin blend has a non-isothermal crystallization half-life of about 23.7 seconds and is considered to be an example of this invention.

EXAMPLE 2

The following blend is prepared in advance by dry blending the components and then melt mixing the components in a single screw 2.5 inch extruder and then used as the adhesive layer in the three component blown film fabrication described above. All percentages are by weight and based on the total adhesive composition.

- 40% LLDPE (Ethylene/Propylene Copolymer, MI=4.5, Density=0.89 grams/cm$^3$)
- 40% LLDPE (Ethylene/Octene Copolymer, MI=6, Density=0.923 grams/cm$^3$)
- 20% HDPE (Ethylene/Propylene Copolymer, MI=25, Density=0.955 grams/cm$^3$) grafted with 0.9% MAH This three component adhesive resin blend has a total MAH content of about 0.18%. The three layer blown film structure has an EVOH adhesion level of about 368 grams/inch. This thermoplastic adhesive resin blend composition has a non-isothermal crystallization half-life of about 25.1 seconds and is an example of this invention.

This resin blend is also used to form single layer blown film for heat seal bonding to EVOH polymers containing different levels of mole percent ethylene. The following table describes the results obtained:

| MOLE PERCENT ETHYLENE IN EVOH | 29% | 32% | 38% | 44% |
|---|---|---|---|---|
| ADHESION (GRMS/HALF INCH) | 245 | 486 | 517 | 599 |

EXAMPLE 3

The following blend is prepared in advance by dry blending the components and then melt mixing the components in a single screw 2.5 inch extruder and then used as the adhesive layer in the three component blown film fabrication described above. All percentages are by weight and based on the total adhesive composition.

- 20% HDPE (Ethylene Homopolymer, MI=10, Density=0.962 grams/cm$^3$) grafted with 1.1% MAH
- 55% LLDPE (Ethylene/Octene Copolymer, MI=6, Density=0.923 grams/cm$^3$)
- 25% PB 1710 (Polybutene polymer commercially available from Shell Chemical Company, MI=1.0, Density=0.909 grams/cm$^3$)

The three component blown film structure using this adhesive resin blend has an EVOH adhesion level of about 345 grams/inch. This adhesive resin blend composition has a total MAH content of about 0.22% and a non-isothermal crystallization half-life of about 27.4 seconds and is an example of this invention.

EXAMPLE 4

The following blend is prepared in advance by dry blending the components and then melt mixing the components in a single screw 2.5 inch extruder and then used as the adhesive layer in the three component blown film fabrication described above. All percentages are by weight and based on the total adhesive composition.

- 20% HDPE (Ethylene Homopolymer, MI=10, Density=0.962 grams/cm$^3$) grafted with 1.1% MAH
- 40% ULDPE (Ethylene/Octene Copolymer, MI=1 Density=0.905 grams/cm$^3$)
- LLDPE (Ethylene/Propylene Copolymer, MI=4.5, Density=0.89 grams/cm$^3$)

The three component blown film structure using this adhesive resin blend has an EVOH adhesion level of about 449 grams/inch. This adhesive resin blend composition has a total MAH content of about 0.22% and a non-isothermal crystallization half-life of about 22.3 seconds and is clearly an example of the invention. A Summary of the data of Examples 1-4 appears below in TABLE I.

TABLE 1

| EXAMPLE | CRYSTALLIZATION HALF-LIFE (SEC) | BOND ADHESION* (GM/IN) | MAH CONTENT (%) |
|---|---|---|---|
| 1 | 23.7 | 382 | 0.24 |
| 2 | 25.1 | 368 | 0.18 |
| 3 | 27.4 | 345 | 0.22 |
| 4 | 22.3 | 449 | 0.22 |

*EVOH adhesion in blown film structures

What is claimed is:

1. A method of improving the adhesive strength of an adhesive layer to a polar barrier layer in a laminated multilayer film structure comprising the steps of:
   (a) measuring the crystallization rate of an aliphatic polyolefin resin blend capable of forming a film structure and
   (b) selecting the aliphatic polyolefin resin blend having a non-isothermal crystallization half-life of less than about 30 seconds for use as the adhesive layer.

2. The method of claim 1 wherein said laminated multilayer structure is a blown film multilayer structure.

3. The method of claim 1, said multilayer structure comprising
   (i) at least one barrier layer,
   (ii) an adhesive layer adjacent to said barrier layer, and
   (iii) at least one structural layer.

4. The method of claim 3, said multilayer structure comprising at least one sealant layer.

5. The method of claim 1 wherein said adhesive layer contains between about 0.03% and about 0.24% of ethylenically unsaturated carboxylic acids or their anhydrides.

6. The method of claim 1 wherein said adhesive layer contains between about 0.03% and about 0.24% of maleic anhydride.

7. The method of claim 1 wherein the barrier layer contains a hydrolyzed ethylene vinyl acetate copolymer.

8. The method of claim 7 wherein said hydrolyzed ethylene vinyl acetate has an ethylene content of between about 2% and about 60% by weight, and a melt index of between about 0.2 and about 50 grams/10 minutes.

9. The method of claim 7 wherein said hydrolyzed ethylene vinyl acetate has an ethylene content of between about 15% and about 40% by weight and a melt index of between about 0.5 and about 20 grams/10 minutes.

10. The method of claim 1 wherein said adhesive layer comprises:

(i) between about 30-98% of at least one unmodified polymer or copolymer and (ii) between about 2-70% of a graft modified ethylene polymer or copolymer.

11. The method of claim 10 wherein said unmodified polymer comprises about 20% to about 100% of a copolymer of ethylene and at least one $C_3$–$C_{12}$ olefin.

12. The method of claim 10 wherein said unmodified polymer comprises between about 30% and about 98% of a multicomponent blend of copolymers of ethylene copolymerized with at least one $C_3$–$C_{12}$ olefin.

13. The method of claim 10 wherein said graft modified ethylene polymer is comprised of a copolymer of ethylene and at least one $C_3$–$C_{12}$ olefin graft modified with between about 0.02 and about 3.0% ethylenically unsaturated carboxylic acids or their anhydrides.

14. The method of claim 10 wherein said graft modified ethylene polymer or copolymer is comprised of HDPE having a pregrafting density between about 0.945 and about 0.970 grams/cubic centimeter, a pregrafting melt index (MI) between about 1 and about 45 which is extrusion graft modified with between about 0.02% and about 3.0% maleic anhydride.

15. The method of claim 10 wherein said unmodified polymer comprises between about 30% and about 98% of a multicomponent blend of between about 5% and about 80% of a polybutene polymer blended with between about 95% and about 20% of copolymers of ethylene with at least one $C_3$–$C_{12}$ olefin.

16. The method of claim 10 wherein said unmodified polymer comprises about 30% to about 98% of a copolymer of ethylene and octene.

17. The method of claim 10 wherein said unmodified polymer comprises between about 30% and about 98% of a multicomponent blend of copolymers of ethylene copolymerized with octene.

18. The method of claim 17 wherein said multicomponent blend of copolymers of ethylene and at least one $C_3$–$C_{12}$ olefin of said adhesive layer comprises:

(i) an LLDPE copolymer having a melt index (MI) between about 0.1 and about 25 and a density between about 0.90 and about 0.93 grams per cubic centimeter (g/cc) and (ii) an LLDPE copolymer having MI between about 0.1 and about 25 and a density between about 0.89 and about 0.92 g/cc.

19. The method of claim 18 wherein the LLDPE copolymers (i) and (ii) are copolymers of ethylene and octene.

20. The method of claim 24 wherein said laminated multilayer structure is a blown film multilayer structure.

21. The method of claim 24 said laminated multilayer structure comprising (i) at least one barrier layer, (ii) an adhesive layer adjacent to said barrier layer, and (iii) at least one structural layer.

22. The method of claim 25, said multilayer structure comprising at least one sealant layer.

23. The method of claim 24 wherein said adhesive layer contains between about 0.03% and about 0.24% of ethylenically unsaturated carboxylic acids or their anhydrides.

24. The method of claim 24 wherein said adhesive layer contains between about 0.03% and about 0.24% of maleic anhydride.

25. The method of claim 24 wherein the barrier layer contains a hydrolyzed ethylene vinyl acetate copolymer.

26. The method of claim 29 wherein said hydrolyzed ethylene vinyl acetate has an ethylene content of between about 2% and about 60% by weight, and a melt index of between about 0.2 and about 50 grams/10 minutes.

27. The method of claim 29 wherein said hydrolyzed ethylene vinyl acetate has an ethylene content of between about 15% and about 40% by weight and a melt index of between about 0.5 and about 20 grams/10 minutes.

28. The method of claim 24 wherein said adhesive layer comprises:

(i) between about 30-98% of at least one unmodified polymer or copolymer and (ii) between about 2-70% of a graft modified ethylene polymer or copolymer.

29. The method of claim 32 wherein said unmodified polymer or copolymer comprises about 20% to about 100% of a copolymer of ethylene and at least one $C_3$–$C_{12}$ olefin.

30. The method of claim 32 wherein said unmodified polymer or copolymer comprises between about 30% and about 98% of a multicomponent blend of copolymers of ethylene copolymerized with at least one $C_3$–$C_{12}$ olefin.

* * * * *